Patented Aug. 5, 1924.

1,503,547

UNITED STATES PATENT OFFICE.

NATHAN MININBERG, OF MINNEAPOLIS, MINNESOTA.

BRAN FOOD FLAKES.

No Drawing. Application filed January 12, 1923. Serial No. 612,290.

*To all whom it may concern:*

Be it known that I, NATHAN MININBERG, a citizen of the United States, residing at Minneapolis, in the county of Hennepin and State of Minnesota, have invented certain new and useful Improvements in Bran Food Flakes; and I do hereby declare the following to be a full, clear, and exact description of the invention, such as will enable others skilled in the art to which it appertains to make and use the same.

This invention relates to food flakes made out of bran, and has for its object to provide an article of this character which will be comparatively inexpensive to produce, and more palatable and healthful in use than those heretofore proposed.

With these and other objects in view, the invention consists in the novel product and details of procedure in producing the same hereinafter disclosed and particularly pointed out in the claims.

In carrying out this invention, I take bran from wheat or other cereals as it comes from the mill, and sift it through a 40-mesh sieve. The residue left on the sifter is then reground and resifted until all of it goes through the sieve. In this way the peculiar flavor of the bran, which is so often found objectionable, is done away with. By breaking up the bran into such fine particles each particle may then be more quickly and more easily saturated and boiled. This appreciably shortens the cooking process, and helps the bran mixture sooner to work into a smooth batter of uniform texture. By reason of this also, the flake is more uniform in texture and shape and therefore stronger and better able to withstand the tendencies to break or crumble while being packed. The fine texture of the bran particles makes these flakes much more palatable than if unground brand were used. When eating unground bran the bran has a tendency to stick to the surfaces of the mouth and throat. Bran flakes made from ground bran are smooth and can be eaten with ease. By this means, I am enabled to incorporate into my finished food flakes all of the valuable constituents originally contained in the bran. I then take 60 ounces of the finely divided bran produced as above, sift it through a sieve into the boiling water, in order that all the bran may be deposited evenly in the water, taking care to stir the mass continuously while the bran is being added. This part of the process should continue for only about one minute and produces a batter composed of the first and finer portions of the bran, since in sifting the bran into the water the finer portions escaped thru the sieve first and the coarser ones later. So that the finer portions have been subjected to the heat longer than the coarser portions of the bran which because of their vitamine and nitrogenous value should not be cooked much. That is, some portions of the bran are fairly well cooked while other portions are almost raw. The batter thus produced is next cooled to about 70° or 80° F. By this time the evaporation during the boiling and cooling of the batter will have caused about 20% of the moisture to escape from the batter, and it is now ready to put into any suitable dropper, such for example as that shown in my patent #1,411,641, dated April 4, 1922, and entitled "Flaked food product and process of producing the same."

If the apparatus shown in my said patent is employed in producing the flakes of this invention, then the said batter from this said dropper may be deposited in small portions or droplets upon the belt 11 shown in said patent. This belt should travel through the oven in about two or three minutes, and the temperature of the oven should be kept from, say, 437° F. to 450° F. That is, the comparatively well cooked and well hydrolyzed portion of the bran mixed with the relatively raw portions thereof is subjected to a relatively high temperature for a short period only, so that the hydrolyzed portions will be heated in a mixture containing the almost raw portion of the bran.

If it is not desired to employ the apparatus of my said patent, in carrying out this invention, then any other suitable apparatus may be used which will secure the above mentioned results. When the flakes leave the oven, they are in a flat or disk like shape, somewhat similar to the well known corn flakes on the market, when the latter leave the rollers that produce them. These said bran flakes are next put into any suitable crisping apparatus, for example, one of the well known nature now used in making said corn flakes and remain there for three or four minutes.

The finished bran flakes produced as above will be found to contain only about 4% of their original moisture content, and to consist of mixtures of crisped, comparatively highly hydrolyzed bran, crisped less and less hydrolyzed bran, and crisped almost raw bran, which together act upon the walls of the stomach and intestines in a most satisfactory manner in curing constipation, and other well known troubles experienced by persons of sedentary habits.

When the flakes leave the oven, they are flat or disk like in shape as above stated, but the crisping process curls up the edges of the disks or flakes, and thus produces a rather hard or grain like consistency which I believe mechanically acts in the stomach and bowels to cause a healthful flow of secretions that are very useful in effecting a cure of the ills above referred to. In addition to this, the crisping of wheat bran in the manner above disclosed serves to partially overcome a flavor peculiar to said bran which is found objectionable by many persons.

In some cases I find it best to mix the wheat bran with the bran of corn or oats or with both, which procedure not only overcomes entirely this said flavor, but is also found in many cases to enhance the beneficial effects in the stomach.

What is claimed is:

1. The herein described new article of manufacture consisting of bran flakes comprising mixtures of portions of bran of different degrees of hydrolyzations together with substantially raw portions of bran, all said portions being crisped to a palatable condition.

2. The process of producing bran flakes which consists in providing a plurality of portions of a cereal bran; hydrolyzing said portions to different degrees; making a mixture of said hydrolyzed portions and adding thereto other portions in substantially a raw state; and crisping a mixture of all of said portions to a palatable condition.

In testimony whereof I affix my signature.

NATHAN MININBERG.